(12) United States Patent
Nie

(10) Patent No.: US 11,042,543 B2
(45) Date of Patent: Jun. 22, 2021

(54) INFORMATION INTERACTION METHOD, SERVER, CLIENT, AND STORAGE MEDIUM AND DEVICE

(71) Applicant: BAIDU ONLINE NETWORK TECHNOLOGY (BEIJING) CO., LTD., Beijing (CN)

(72) Inventor: Xiaomeng Nie, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 108 days.

(21) Appl. No.: 16/331,348

(22) PCT Filed: Apr. 10, 2017

(86) PCT No.: PCT/CN2017/079855
§ 371 (c)(1),
(2) Date: Mar. 7, 2019

(87) PCT Pub. No.: WO2018/076616
PCT Pub. Date: May 3, 2018

(65) Prior Publication Data
US 2019/0188199 A1 Jun. 20, 2019

(30) Foreign Application Priority Data
Oct. 28, 2016 (CN) .......................... 201610963435.5

(51) Int. Cl.
*G06F 7/00* (2006.01)
*G06F 16/2453* (2019.01)
(Continued)

(52) U.S. Cl.
CPC ...... *G06F 16/2453* (2019.01); *G06F 16/2425* (2019.01); *G06Q 30/02* (2013.01);
(Continued)

(58) Field of Classification Search
CPC . G06F 16/2453; G06F 16/2425; G06Q 30/02; H04M 1/725
(Continued)

(56) References Cited

U.S. PATENT DOCUMENTS 10,360,265 B1 * 7/2019 Agarwal ........... G06F 16/90332
2014/0053088 A1 2/2014 Civelli et al.
(Continued)

FOREIGN PATENT DOCUMENTS

CN 104239442 A 12/2014
CN 104239459 A 12/2014
(Continued)

OTHER PUBLICATIONS

Japanese Patent Application No. JP2019-510677, Office Action dated Jan. 28, 2020, 3 pages.
(Continued)

*Primary Examiner* — Isaac M Woo
(74) *Attorney, Agent, or Firm* — Lathrop GPM LLP

(57) ABSTRACT

An information interaction method, a server, and a client are provided. The method includes: receiving speech search information and a history search result sent by a client; in response to determining based on the history search result that the client is loaded with speech interaction data, determining feedback information corresponding to the speech search information based on the loaded speech interaction data; and sending the feedback information to the client, such that the client loads the feedback information.

11 Claims, 4 Drawing Sheets

(51) Int. Cl.
*G06F 16/242* (2019.01)
*G06Q 30/02* (2012.01)
*H04M 1/725* (2021.01)
*G10L 15/22* (2006.01)

(52) U.S. Cl.
CPC ............. *H04M 1/725* (2013.01); *G10L 15/22* (2013.01); *G10L 2015/223* (2013.01)

(58) Field of Classification Search
USPC .................................................. 707/600–899
See application file for complete search history.

(56) References Cited

U.S. PATENT DOCUMENTS

2016/0070793 A1    3/2016  Jing et al.
2016/0360336 A1*  12/2016  Gross ...................... H04W 4/50

FOREIGN PATENT DOCUMENTS

| CN | 105302871 A | 2/2016 |
| CN | 105491126 A | 4/2016 |
| CN | 105955703 A | 9/2016 |
| JP | 2003132060 A | 5/2003 |
| JP | 2014501004 A | 1/2014 |
| JP | 2014106927 A | 6/2014 |

OTHER PUBLICATIONS

Japanese Patent Application No. JP2019-510677, English translation of Office Action dated Jan. 28, 2020, 3 pages.
PCT/CN2017/079855 English translation of International Search Report dated Jul. 27, 2017, 2 pages.
Chinese Patent Application No. 201610963435.5, Office Action dated Apr. 6, 2021, 7 pages.
Chinese Patent Application No. 201610963435.5, English translation of Office Action dated Apr. 6, 2021, 8 pages.

* cited by examiner

INFORMATION INTERACTION METHOD, SERVER, CLIENT, AND STORAGE MEDIUM AND DEVICE

CROSS REFERENCE TO RELATED APPLICATION

This application is a U.S. national phase application of International Application No. PCT/CN2017/079855, filed on Apr. 10, 2017, which is based upon and claims priority to Chinese Patent Application Serial No. 201610963435.5, filed on Oct. 28, 2016, the entire contents of which are cooperated herein by reference.

FIELD

The present disclosure relates to a field of information interaction technologies, and more particularly to an information interaction method, a server, a client, a storage medium and a device.

BACKGROUND

With the development of the computer technology and network, more and more users use an intelligent device to search to obtain needed information.

At present, APPs or browsers installed in many intelligent devices have a speech search function, that is, a user only needs to input a speech and then information search may be finished, which overcomes a disadvantage brought by performing searching upon text information being manually inputted. However, in the related art, the user cannot perform speech interaction with information in a feedback search result or in a search webpage when performing a speech search, such that an application scene of a current speech search way is single and search efficiency is low, which cannot satisfy a need that the user performs the speech interaction with the information.

SUMMARY

The present disclosure provides an information interaction method, a server, a client, a storage medium and a device, such that a user may perform interaction with information through a speech way, a search efficiency is improved and a scene that a search process may be applied to is more diversified.

In the first aspect, embodiments of the present disclosure provide an information interaction method, including:

receiving speech search information and a history search result sent by a client;

in response to determining based on the history search result that the client is loaded with speech interaction data, determining feedback information corresponding to the speech search information based on the loaded speech interaction data; and sending the feedback information to the client, such that the client loads the feedback information.

In the second aspect, embodiments of the present disclosure further provide an information interaction method, including:

displaying prompt information corresponding to speech interaction data in a history search result when a display interface of the history search result detects that a speech search event is triggered;

obtaining speech search information input by a user, and sending the speech search information and the history search result to a server; and receiving feedback information corresponding to the speech interaction data and sent by the server, and loading the feedback information.

In the third aspect, embodiments of the present disclosure further provide an information interaction server, including:

a speech information receiving module, configured to receive speech search information and a history search result sent by a client;

a feedback information determining module, configured to, in response to determining based on the history search result that the client is loaded with speech interaction data, determine feedback information corresponding to the speech search information based on the loaded speech interaction data; and a feedback information sending module, configured to send the feedback information to the client, such that the client loads the feedback information.

In the fourth aspect, embodiments of the present disclosure further provide an information interaction client, including:

a prompt information display module, configured to display prompt information corresponding to speech interaction data in a history search result when a display interface of the history search result detects that a speech search event is triggered;

a speech information obtaining module, configured to obtain speech search information input by a user;

a feedback information sending module, configured to send the speech search information and the history search result to a server;

a feedback information receiving module, configured to receive feedback information corresponding to the speech interaction data and sent by the server; and a feedback information loading module, configured to load the feedback information.

In the fifth aspect, embodiments of the present disclosure provide one or more storage medium containing a computer executable instruction. When being executed by a computer processor, the computer executable instruction is configured to execute an information interaction method, and the method includes:

receiving speech search information and a history search result sent by a client;

in response to determining based on the history search result that the client is loaded with speech interaction data, determining feedback information corresponding to the speech search information based on the loaded speech interaction data; and sending the feedback information to the client, such that the client loads the feedback information.

In the sixth aspect, embodiments of the present disclosure provide one or more storage medium containing a computer executable instruction. When being executed by a computer processor, the computer executable instruction is configured to execute an information interaction method, and the method includes:

displaying prompt information corresponding to speech interaction data in a history search result when a display interface of the history search result detects that a speech search event is triggered;

obtaining speech search information input by a user, and sending the speech search information and the history search result to a server; and receiving feedback information which corresponds to the speech interaction data and is sent by the server, and loading the feedback information.

In the seventh aspect, embodiments of the present disclosure provide a device, including:

one or more processors;

a memory;

one or more programs, stored in the memory, and configured to perform following operations when executed by the one or more processors:

receiving speech search information and a history search result sent by a client;

in response to determining based on the history search result that the client is loaded with speech interaction data, determining feedback information corresponding to the speech search information based on the loaded speech interaction data; and sending the feedback information to the client, such that the client loads the feedback information.

In the eighth aspect, embodiments of the present disclosure further provide a device, including:

one or more processors;

a memory;

one or more programs, stored in the memory, and configured to perform following operations when executed by the one or more processors:

displaying prompt information corresponding to speech interaction data in a history search result when a display interface of the history search result detects that a speech search event is triggered;

obtaining speech search information input by a user, and sending the speech search information and the history search result to a server; and receiving feedback information which corresponds to the speech interaction data and is sent by the server, and loading the feedback information.

DETAILED DESCRIPTION

Description will be made in detail below to the present disclosure with reference to the embodiments and the drawings. It should be understood that, detailed embodiments described herein are intended only to explain the present disclosure, and are not limited to the present disclosure. In addition, it should be further noted that, for the convenience of description, only some contents but not all of the structure related to the present disclosure are illustrated in the accompanying drawings.

Embodiment 1

Figure 1:
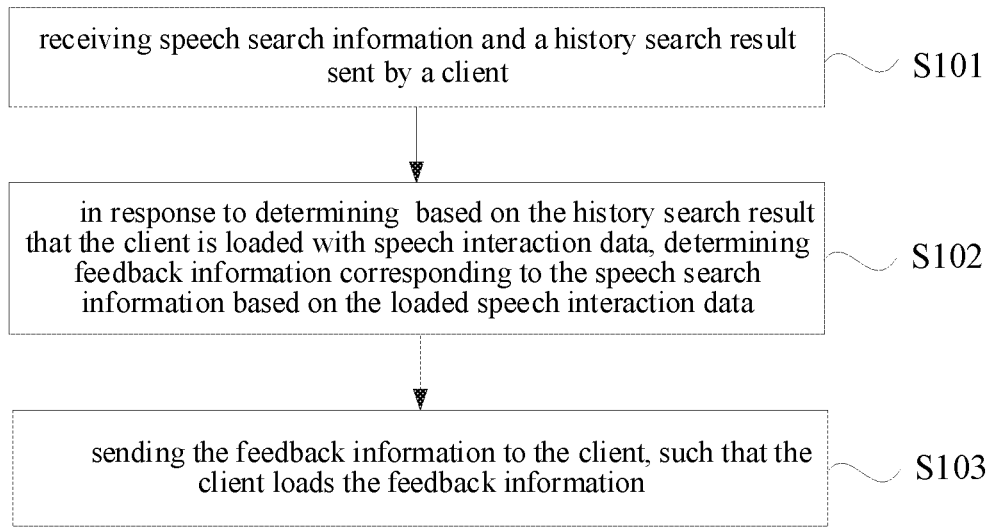
FIG. 1 is a flow chart illustrating an information interaction method provided in Embodiment 1 of the present disclosure.

FIG. 1 is a flow chart illustrating an information interaction method provided in Embodiment 1 of the present disclosure. The embodiment may be applicable to a case that a user uses a speech search service. The method may be executed by a computer device such as a server. The method includes following blocks in detail.

In block S101, speech search information and a history search result sent by a client are received.

The client may be an intelligent device used by the user, such as a mobile phone, a table computer. The user may perform speech search through a search application or a browser installed in the client. For example, after the user clicks a speech button in a search interface, the client may obtain speech issued by the user subsequently through an integrated microphone, and feed back a corresponding search result to the user based on the speech. In this block, the received speech search information sent by the client includes a speech directly input by the user, and the history search result sent by the client is also received while receiving the speech search information, in which, the history search result may be the history search result determined during the current round of search interaction, and may further include the search results determined during other rounds in the history search.

In block S102, in response to determining based on the history search result that the client is loaded with speech interaction data, feedback information corresponding to the speech search information is determined based on the loaded speech interaction data.

The loaded speech interaction data may be speech interaction advertisement loaded by the client, such as aviation speech interaction advertisement of an airline, catering speech interaction advertisement of a restaurant. In this block, a procedure of determining based on the history search result that the client is loaded with the speech interaction data may be: determining that the client is loaded with the speech interaction data through the triggered interaction method or the triggered speech information recorded in the search result.

In this block, when the feedback information corresponding to the speech search information is fed back to the client, it is based on the speech interaction data loaded by the client. For example, the user obtains the catering speech interaction advertisement by inputting speech information "I want to eat" when having meal demand, for example, advertisement information of "Liuliqiao XX store" may be displayed in the client interface. In this case, when the user inputs a speech "roast duck" again, the server feeds back to the user feedback information corresponding to "roast duck" on the basis of the speech interaction advertisement of "Liuliqiao XX store" loaded by the client, and the feedback information includes recipes and prices for "roast duck" available in "Liuliqiao XX Store".

In the block, when determining the feedback information corresponding to the speech search information based on the loaded speech interaction data, the procedure of performing semantic parsing on the speech search information is included, and semantic and text vocabulary corresponding to the speech search information are obtained by semantic parsing for determining the feedback information.

In block S103, the feedback information is sent to the client, such that the client loads the feedback information.

In the block, the server sends the feedback information determined by block S102 to the client for loading, and the client displays the feedback information and interacts with the user after finishing loading.

In the technical solution of this embodiment, the server may determine the feedback information based on the speech interaction data loaded by the client when feeding back information to the client, thus implementing continuous multiple rounds of interaction when the user uses the client to perform speech search, and intelligently distributing the search result of the speech search information.

In the foregoing technical solution, block S102 may further be: in response to determining that the client is loaded with the speech interaction data based on the history search result, determining the feedback information corresponding to the speech search information. If it is determined based on the history search result that the client is loaded with the speech interaction data, it indicates that the client supports the interaction of the speech interaction data. In this case, the semantic parsing may be performed directly on the speech search data to determine the keyword, and further the feedback information corresponding to the keyword is determined and directly fed back to the client.

On the basis of the foregoing technical solution, before receiving the speech search information and the history search result sent by the client, the method further includes: receiving a client parameter and the speech search information sent by the client; when there is the speech interaction data corresponding to the speech search information, and it is determined according to the client parameter that the client supports interaction of the speech interaction data, sending the speech interaction data to the client, such that the client loads the speech interaction data. The foregoing block of Embodiment 1 may be understood to be a procedure of performing multiple rounds of interaction based on the speech search information, and this step may be understood to be a search establishing procedure before the interaction procedure. In detail, when the user starts to perform the speech search through the client, the server receives the client parameter and the speech search information input by the client, in which the client parameter represents whether the client supports the multiple rounds of interaction of the speech interaction data. When the server determines that the client supports the speech interaction data and also hits the speech interaction data corresponding to the speech search information, it sends the speech interaction data to the client for loading. Accordingly, when the speech interaction data corresponding to the speech search information is not found or the client does not support the interaction of the speech interaction data, the common data is returned.

Embodiment 2

Figure 2:
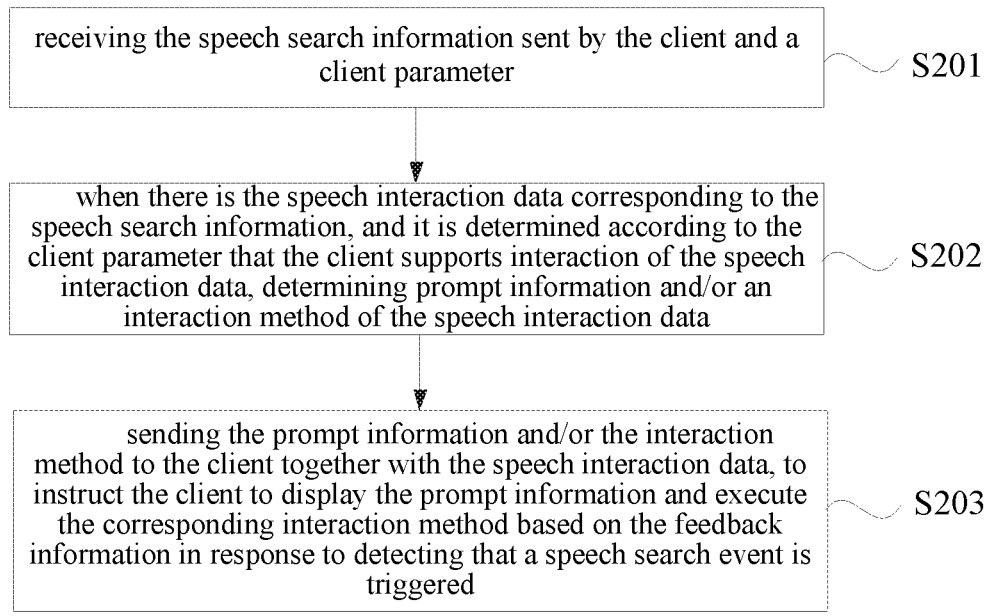
FIG. 2 is a flow chart illustrating an information interaction method provided in Embodiment 2 of the present disclosure.

FIG. 2 is a flow chart illustrating an information interaction method provided in Embodiment 2 of the present disclosure. On the basis of the above Embodiment 1, this embodiment further adds steps of determining prompt information and/or an interaction method of the speech interaction data, and sending the prompt information and/or the interaction method to the client together with the speech interaction data. The embodiment may include following blocks in detail.

In block S201, a client parameter and the speech search information sent by the client are received.

In block S202, when there is the speech interaction data corresponding to the speech search information, and it is determined according to the client parameter that the client supports the interaction of the speech interaction data, prompt information and/or an interaction method of the speech interaction data is determined.

For example, a speech input by the user is "I want to take a flight", and then obtained speech interaction data corresponding to "I want to take a flight" is aviation speech interaction advertisement of Air China. In this case, the determined prompt information corresponding to the aviation speech interaction advertisement may be "Air China, I want to check in", and the corresponding interaction method may be a seat diagram when check-in. The prompt information may prompt the user a speech vocabulary that is suggested to be used for the interaction with the current speech interaction data during the speech search, and the interaction method may be invoked based on the hit interaction vocabulary to display a corresponding interaction logic.

In block S203, the prompt information and/or the interaction method is sent to the client together with the speech interaction data, to instruct the client to display the prompt information and execute the corresponding interaction method based on the feedback information in response to detecting that a speech search event is triggered.

For example, the speech search event may be triggered when the user clicks a speech interaction button displayed in the client interface. The prompt information may be displayed in the client interface in a form of floating window, or may be issued in a form of speech. After receiving the interaction method, the client may directly invoke the interaction method based on the feedback information subsequently received. Alternatively, the prompt information and the interaction method are only for the currently loaded speech interaction data, that is, the information prompt is performed to prompt a speech interaction action which may be performed for the currently loaded speech interaction data. The interaction method is also based on the current speech interaction data. When the client receives the feedback information, the feedback information may carry the prompt information and the executable method corresponding to the next round of the speech interaction data. Alternatively, the prompt information and the interaction methods of all interaction rounds that can be performed by the speech interaction data may be sent to the client in one time.

With the technical solution of this embodiment, by determining the prompt information and/or the interaction method of the speech interaction data, and sending the prompt information and/or the interaction method to the client together with the speech interaction data, it is possible to instruct the client to display the prompt information in response to detecting that the speech search event is triggered, which helps the user more efficiently know about the interaction content that may be performed by the speech interaction data, improves speech search efficiency of the user, and moreover enables the client to execute the corresponding interaction method based on the feedback information. The interaction method has been loaded in the client during the previous interaction round of the speech data, and may quickly respond to the speech search information input by the user.

Embodiment 3

Figure 3:
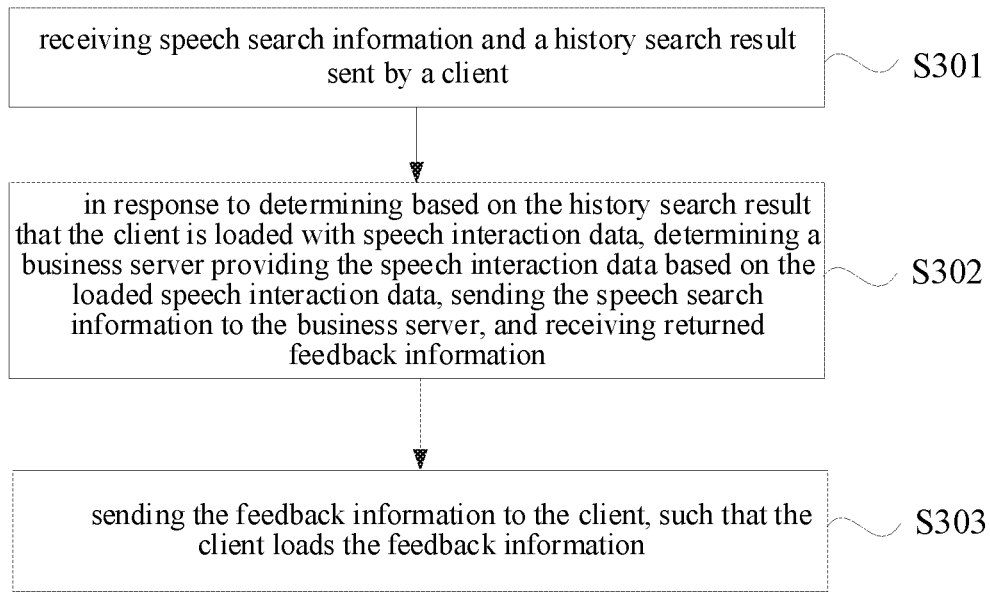
FIG. 3 is a flow chart illustrating an information interaction method provided in Embodiment 3 of the present disclosure.

FIG. 3 is a flow chart illustrating an information interaction method provided in Embodiment 3 of the present disclosure. On the basis of the foregoing respective embodiments, this embodiment gives a detailed method of determining feedback information corresponding to speech search information based on loaded speech interaction data, which specifically includes following blocks.

In block S301, the speech search information and a history search result sent by a client are received.

In block S302, in response to determining based on the history search result that the client is loaded with speech interaction data, a business server providing the speech interaction data is determined based on the loaded speech interaction data, the speech search information is sent to the business server, and returned feedback information is received.

For example, the business server providing the speech interaction data may be a speech interaction advertisement server provided by a supplier. In this block, by searching for the feedback information corresponding to the speech search information in the business server, the server which is the executive body in the block acts as a relay point, to connect the client and the business server, and to associate the speech interaction data in the business server with the speech search information sent by the client.

In block S303, the feedback information is sent to the client, such that the client loads the feedback information.

With the technical solution of this embodiment, the business server providing the speech interaction data is determined based on the loaded speech interaction data, the speech search information is sent to the business server, and returned feedback information is received, which may connect the client supporting the speech interaction data with the business server providing the speech interaction data. Moreover, the business server may be provided by the respective supplier itself, which improves the search and display efficiency of the speech interaction data.

Embodiment 4

Figure 4:
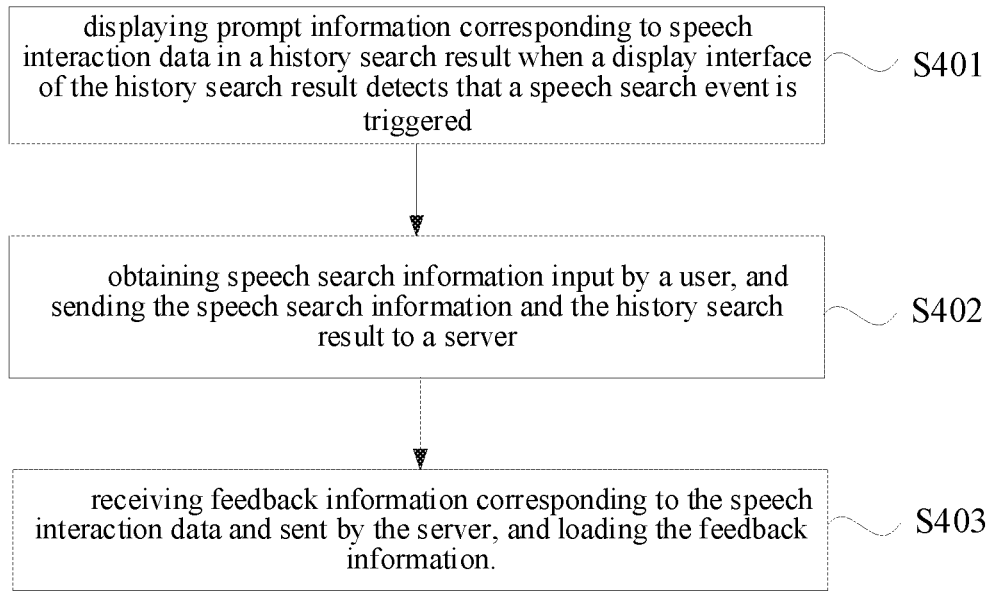
FIG. 4 is a flow chart illustrating an information interaction method provided in Embodiment 4 of the present disclosure.

FIG. 4 is a flow chart illustrating an information interaction method provided in Embodiment 4 of the present disclosure. This embodiment may be applicable to a case that a user uses a speech search service. The method may be executed by a client, specifically including following blocks.

In block S401, prompt information corresponding to speech interaction data in a history search result is displayed when a display interface of the history search result detects that a speech search event is triggered.

In block S402, speech search information input by the user is obtained, and the speech search information and the history search result are sent to a server.

In block S403, feedback information corresponding to the speech interaction data and sent by the server is received, and the feedback information is loaded.

With the technical solution of this embodiment, when the user needs to perform the speech search, the prompt information may be issued, such that the user may implement the interaction of the speech data more efficiently, and moreover send the history search result to the server while sending the speech search information, and may obtain further feedback information based on the speech interaction data, such that the user may perform interaction with the information through a speech way, the search efficiency is improved and the scene that the search process may be applied to is more diversified.

On the basis of the foregoing technical solution, before displaying prompt information corresponding to the speech interaction data in the history search result, the method further includes: receiving the speech interaction data carried in the search result sent by the server, and the prompt information and/or an interaction method corresponding to the speech interaction data.

On the basis of the foregoing technical solution, the feedback information includes a hit vocabulary corresponding to the speech search information and an execution parameter of the interaction method; loading the feedback information includes: executing the interaction method based on the execution parameter, and displaying an interface generated by the interaction method.

Embodiment 5

Figure 5:
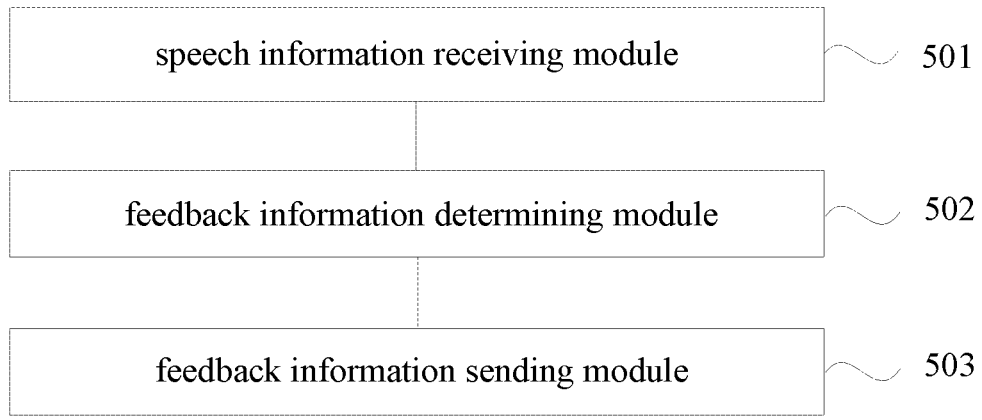
FIG. 5 is a block diagram illustrating an information interaction server provided in Embodiment 5 of the present disclosure.

FIG. 5 is a block diagram illustrating an information interaction server provided in Embodiment 5 of the present disclosure. As illustrated in FIG. 5, the server especially includes: a speech information receiving module 501, a feedback information determining module 502 and a feedback information sending module 503.

The speech information receiving module 501 is configured to receive speech search information and a history search result sent by a client.

The feedback information determining module 502 is configured to, in response to determining based on the history search result that the client is loaded with speech interaction data, determine feedback information corresponding to the speech search information based on the loaded speech interaction data.

The feedback information sending module 503 is configured to send the feedback information to the client, such that the client loads the feedback information.

In the technical solution of this embodiment, when feeding back information to the client, the server may determine the feedback information based on the speech interaction data loaded by the client, which may implement continuous multiple rounds of interaction when the user uses the client for speech search, and may intelligently distribute the search results of the speech search information.

On the basis of the foregoing technical solution, the speech information receiving module 501 is further configured to:

receive a client parameter and the speech search information sent by the client;

the feedback information sending module 503 is further configured to:

when there is the speech interaction data corresponding to the speech search information, and it is determined according to the client parameter that the client supports interaction of the speech interaction data, send the speech interaction data to the client, such that the client loads the speech interaction data.

On the basis of the foregoing technical solution, the feedback information determining module 502 is further configured to:

determine prompt information and/or an interaction method of the speech interaction data;

the feedback information sending module 503 is specifically configured to:

send the prompt information and/or the interaction method to the client together with the speech interaction data, to instruct the client to display the prompt information and execute the corresponding interaction method based on the feedback information in response to detecting that a speech search event is triggered.

On the basis of the foregoing technical solution, the feedback information determining module 502 is specifically configured to:

determine a business server providing the speech interaction data based on the loaded speech interaction data; and send the speech search information to the business server, and receive returned feedback information.

The foregoing product may execute the method according to any of Embodiment 1 to Embodiment 3 provided in the present disclosure, and has function modules and beneficial effects corresponding to executing the method.

Embodiment 6

Figure 6:
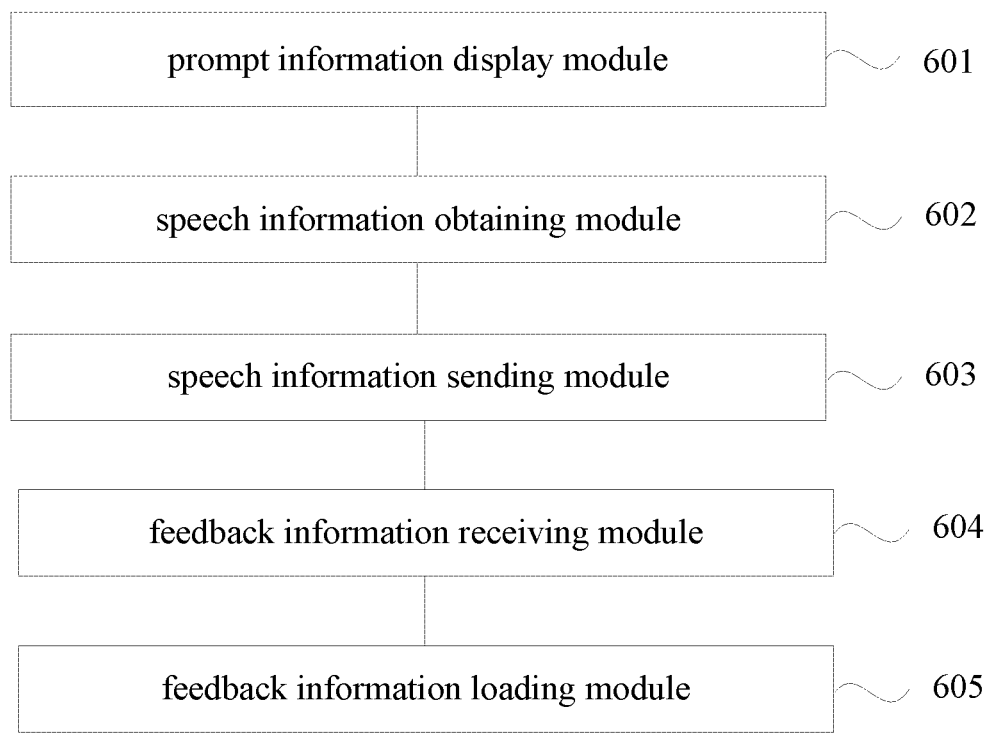
FIG. 6 is a block diagram illustrating an information interaction client provided in Embodiment 6 of the present disclosure.

FIG. 6 is a block diagram illustrating an information interaction client provided in Embodiment 6 of the present disclosure. As illustrated in FIG. 6, the server includes: a prompt information display module 601, a speech information obtaining module 602, a speech information sending module 603, a feedback information receiving module 604 and a feedback information loading module 605.

The prompt information display module 601 is configured to display prompt information corresponding to speech interaction data in a history search result when a display interface of the history search result detects that a speech search event is triggered.

The speech information obtaining module 602 is configured to obtain speech search information input by a user.

The speech information sending module 603 is configured to send the speech search information and the history search result to a server.

The feedback information receiving module 604 is configured to receive feedback information corresponding to the speech interaction data and sent by the server.

The feedback information loading module 605 is configured to load the feedback information.

With the technical solution of this embodiment, when the user needs to perform the speech search, the prompt information may be issued, such that the user may implement the interaction of the speech data more efficiently, and moreover send the history search result to the server while sending the speech search information, and may obtain further feedback information based on the speech interaction data, such that the user may perform interaction with the information through a speech way, the search efficiency is improved and the scene that the search process may be applied to is more diversified.

On the basis of the foregoing technical solution, the feedback information receiving module 604 is further configured to:

receive the speech interaction data carried in the search result sent by the server, and prompt information and/or an interaction method corresponding to the speech interaction data.

On the basis of the foregoing technical solution, the feedback information includes a hit vocabulary corresponding to the speech search information and an execution parameter of the interaction method;

the feedback information loading module 605 is specifically configured to:

execute the interaction method based on the execution parameter, and display an interface generated by the interaction method.

The foregoing product may execute the method provided in Embodiment 4 of the present disclosure, and has function modules and beneficial effects corresponding to executing the method.

Embodiment 7

Embodiment 7 of the present disclosure provides a storage medium containing computer executable instructions. When executed by a computer processor, the computer executable instructions are configured to execute an information interaction method, and the method includes:

receiving speech search information and a history search result sent by a client;

in response to determining based on the history search result that the client is loaded with speech interaction data, determining feedback information corresponding to the speech search information based on the loaded speech interaction data; and sending the feedback information to the client, such that the client loads the feedback information.

When the foregoing storage medium executes the method, before receiving the speech search information and the history search result sent by the client, the method further includes:

receiving the speech search information sent by the client and a client parameter; and when there is the speech interaction data corresponding to the speech search information, and it is determined according to the client parameter that the client supports interaction of the speech interaction data, sending the speech interaction data to the client, such that the client loads the speech interaction data.

When the foregoing storage medium executes the method, the method further includes:

determining prompt information and/or an interaction method of the speech interaction data; and sending the prompt information and/or the interaction method to the client together with the speech interaction data, to instruct the client to display the prompt information and execute the corresponding interaction method based on the feedback information in response to detecting that a speech search event is triggered.

When the foregoing storage medium executes the method, determining the feedback information corresponding to the speech search information based on the loaded speech interaction data includes:

determining a business server providing the speech interaction data based on the loaded speech interaction data; and sending the speech search information to the business server, and receiving returned feedback information.

Embodiment 8

Embodiment 8 of the present disclosure provides a storage medium containing computer executable instructions. When executed by a computer processor, the computer executable instructions are configured to execute an information interaction method, and the method includes:

displaying prompt information corresponding to speech interaction data in a history search result when a display interface of the history search result detects that a speech search event is triggered;

obtaining speech search information input by a user, and sending the speech search information and the history search result to a server; and receiving feedback information which corresponds to the speech interaction data and is sent by the server, and loading the feedback information.

When the forgoing storage medium executes the method, before displaying the prompt information corresponding to the speech interaction data in the history search result, the method further including:

receiving the speech interaction data carried in the search result sent by the server, and the prompt information and/or an interaction method corresponding to the speech interaction data.

When the forgoing storage medium executes the method, the feedback information includes a hit vocabulary corresponding to the speech search information and an execution parameter of the interaction method;

loading the feedback information includes:

executing the interaction method based on the execution parameter, and displaying an interface generated by the interaction method.

The computer storage medium involved in embodiments of the present disclosure may employ any combination of one or more computer readable mediums. The computer readable medium may be a computer readable signal medium or a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The data signal transmitted may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

Embodiment 9

Figure 7:
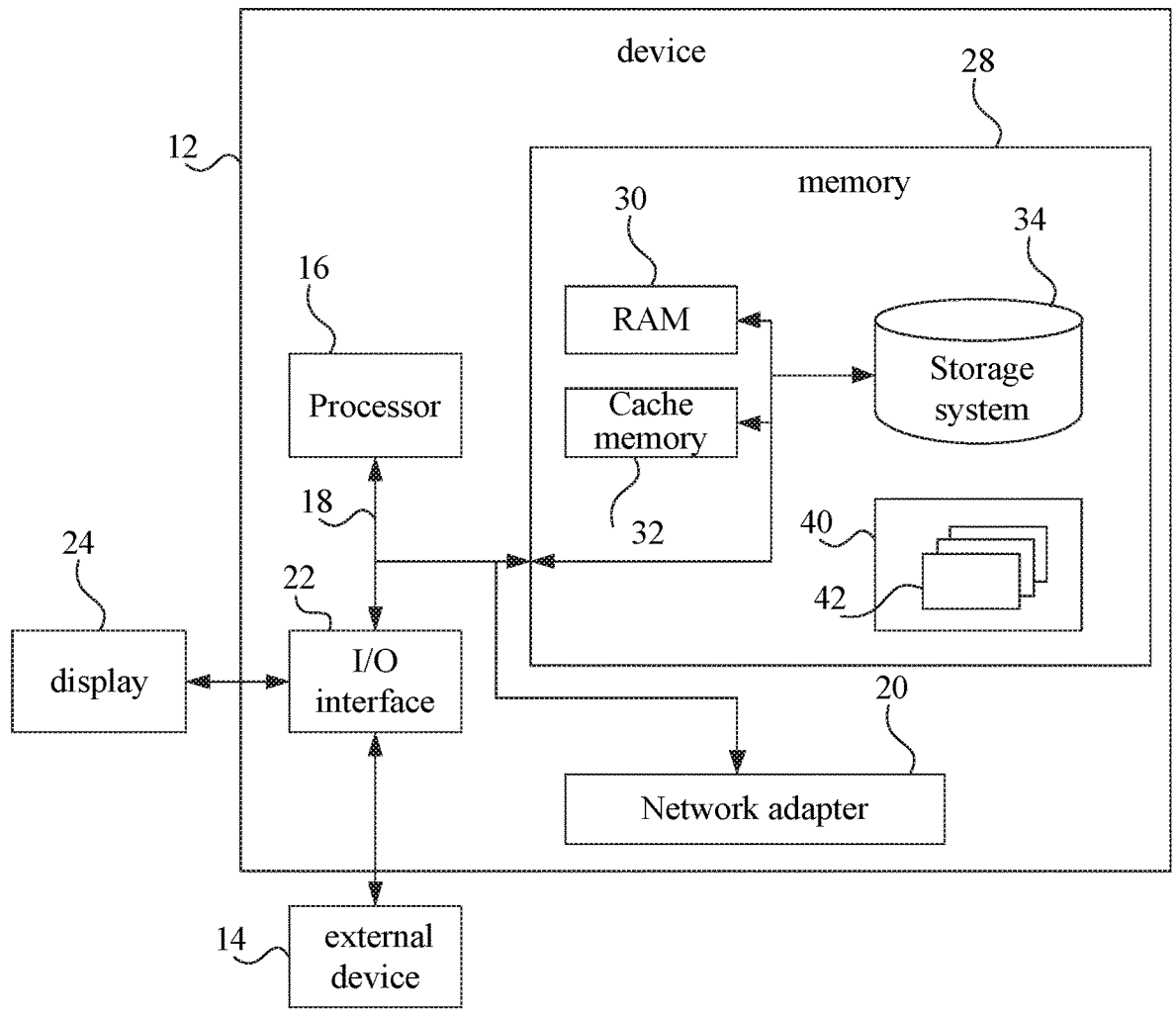
FIG. 7 is a schematic diagram illustrating a hardware structure of a device for executing an information interaction method provided in Embodiment 9 of the present disclosure.

FIG. 7 is a schematic diagram illustrating a hardware structure of a device for executing an information interaction method provided in embodiment 9 of the present disclosure. The device 12 illustrated in FIG. 7 is only an example, which may not bring any limitation to functions and scope of embodiments of the present disclosure.

As illustrated in FIG. 7, the device 12 is embodied in the form of a general-purpose computer device. Components of the device 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The device 12 typically includes various computer system readable mediums. These mediums may be any usable medium that may be accessed by the device 12, including volatile and non-volatile mediums, removable and non-removable mediums.

The system memory 28 may include computer system readable mediums in the form of volatile medium, such as a RAM (Random Access Memory) 30 and/or a cache memory 32. The device 12 may further include other removable/non-removable, volatile/non-volatile computer system storage mediums. Only as an example, the storage system 34 may be configured to read from and write to non-removable, non-volatile magnetic mediums (not illustrated in FIG. 7, which is usually called "a hard disk driver"). Although not illustrated in FIG. 7, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The device 12 may communicate with one or more external devices 14 (such as a keyboard, a pointing device, a display 24), may further communicate with one or more devices enabling a user to interact with the device 12, and/or may communicate any device (such as a network card, and a modem) enabling the device 12 to communicate with one or more other computer devices. Such communication may occur via an Input/Output (I/O) interface 22. Moreover, the device 12 may further communicate with one or more networks (such as LAN (Local Area Network), WAN (Wide Area Network) and/or public network, such as Internet) via a network adapter 20. As illustrated in FIG. 7, the network adapter 20 communicates with other modules of the device 12 via the bus 18. It should be understood that, although not illustrated in FIG. 7, other hardware and/or software modules may be used in combination with the device 12, including but not limited to: microcode, device drivers, redundant processing units, external disk drive arrays, RAID (Redundant Array of Independent Disks) systems, tape drives, and data backup storage systems, etc.

The processor 16, by operating programs stored in the system memory 28, executes various function applications and data processing, for example implements an information interaction method provided in embodiments of the present disclosure.

Through the above description of the embodiments, those skilled in the art can clearly understand that, the present disclosure may be implemented by means of software and necessary general hardware, of course, may further be implemented by hardware. However, in many cases, the former implementation is preferred. Based on such understanding, the technical solutions of the present disclosure substantively, or a part thereof making a contribution to the prior art, may be reflected in the form of computer software product. The computer software product may be stored in a computer readable storage medium such as a floppy disk, a ROM (Read-Only Memory), a RAM (Random Access Memory), a flash, a hard disk and an optical disk of a computer, and may include several instructions to enable a computer equipment (e.g., a personal computer, a server, a network device, etc.) to execute the methods in respective embodiments of the present disclosure.

It should be noted that, in the embodiments of the foregoing server and the client, the included respective units and modules are divided only according to logical functions, but not limited to the foregoing division, as long as corresponding functions can be realized; in addition, the specific names of the respective functional units are also only used for distinguishing from each other conveniently, and are not intended to limit the protection scope of the present disclosure.

The above is only a specific embodiment of the present disclosure, but the protection scope of the present disclosure is not limited to this. Any changes or substitutions that may be easily thought of by a technical person familiar with the technical field within the scope of this disclosure shall be covered by the protection scope of this present disclosure. Therefore, the protection scope of the present disclosure shall be subject to the protection scope of the claims.

What is claimed is:

1. An information interaction method, comprising:
   receiving speech search information and a history search result sent by a client;
   in response to determining based on the history search result that the client is loaded with speech interaction data, determining feedback information corresponding to the speech search information based on the loaded speech interaction data, wherein, the speech interaction data is a speech interaction advertisement related to a specific entity and obtained based on speech information input prior to the speech search information, the speech interaction advertisement is currently displayed on a client interface, and the speech search information is a speech search interacted with the speech interaction advertisement; and
   sending the feedback information to the client, such that the client loads the feedback information.

2. The method according to claim 1, before receiving the speech search information and the history search result sent by the client, further comprising:
   receiving the speech search information sent by the client and a client parameter;
   when the speech interaction data is corresponding to the speech search information, and the client is determined to support interaction of the speech interaction data according to the client parameter, sending the speech interaction data to the client, such that the client loads the speech interaction data.

3. The method according to claim 2, further comprising:
   determining prompt information and/or an interaction method of the speech interaction data;
   sending the prompt information and/or the interaction method to the client together with the speech interaction data, to instruct the client to display the prompt information and execute the corresponding interaction method based on the feedback information in response to detecting that a speech search event is triggered.

4. The method according to claim 1, wherein, determining the feedback information corresponding to the speech search information based on the loaded speech interaction data comprises:
   determining a business server providing the speech interaction data based on the loaded speech interaction data;
   sending the speech search information to the business server, and receiving returned feedback information.

5. An information interaction method, comprising:
   displaying prompt information corresponding to speech interaction data in a history search result when a display interface of the history search result detects that a speech search event is triggered, wherein, the speech interaction data is a speech interaction advertisement related to a specific entity and obtained based on speech information input prior to the speech search information, the speech interaction advertisement is currently displayed on a client interface, and the speech search information is a speech search interacted with the speech interaction advertisement;
   obtaining speech search information input by a user, and sending the speech search information and the history search result to a server; and
   receiving feedback information corresponding to the speech interaction data and sent by the server, and loading the feedback information.

6. The method according to claim 5, before displaying the prompt information corresponding to the speech interaction data in the history search result, further comprising:
   receiving the speech interaction data carried in the search result sent by the server, and the prompt information and/or an interaction method corresponding to the speech interaction data.

7. The method according to claim 5, wherein, the feedback information comprises a hit vocabulary corresponding to the speech search information and an execution parameter of the interaction method;

loading the feedback information comprises:
executing the interaction method based on the execution parameter, and displaying an interface generated by the interaction method.

8. A server, comprising:

one or more processors;

a memory, configured to store one or more software modules executable by the one or more processors, wherein the one or more software modules comprise:

a speech information receiving module, configured to receive speech search information and a history search result sent by a client;

a feedback information determining module, configured to, in response to determining based on the history search result that the client is loaded with speech interaction data, determine feedback information corresponding to the speech search information based on the loaded speech interaction data, wherein, the speech interaction data is a speech interaction advertisement related to a specific entity and obtained based on speech information input prior to the speech search information, the speech interaction advertisement is currently displayed on a client interface, and the speech search information is a speech search interacted with the speech interaction advertisement; and a feedback information sending module, configured to send the feedback information to the client, such that the client loads the feedback information.

9. The server according to claim 8, wherein the speech information receiving module is further configured to:

receive the speech search information sent by the client and a client parameter;

the feedback information sending module is further configured to:

when the speech interaction data is corresponding to the speech search information, and the client is determined to support interaction of the speech interaction data according to the client parameter, send the speech interaction data to the client, such that the client loads the speech interaction data.

10. The server according to claim 9, wherein, the feedback information determining module is further configured to:

determine prompt information and/or an interaction method of the speech interaction data;

the feedback information sending module is specifically configured to:

send the prompt information and/or the interaction method to the client together with the speech interaction data, to instruct the client to display the prompt information and execute the corresponding interaction method based on the feedback information in response to detecting that a speech search event is triggered.

11. The server according to claim 8, wherein, the feedback information determining module is specifically configured to:

determine a business server providing the speech interaction data based on the loaded speech interaction data;

send the speech search information to the business server, and receive returned feedback information.

* * * * *